United States Patent [19]

Aldridge

[11] Patent Number: 5,507,531
[45] Date of Patent: Apr. 16, 1996

[54] SEAL ENHANCER FOR CYLINDER VALVE CONNECTION

[75] Inventor: Lewis L. Aldridge, Parsippany-Troy Hills, N.J.

[73] Assignee: Ewal Manufacturing Company, Inc., Belleville, N.J.

[21] Appl. No.: 434,753

[22] Filed: May 4, 1995

[51] Int. Cl.⁶ .................................................. F16L 35/00
[52] U.S. Cl. .................. 285/39; 285/55; 285/93; 285/332.3; 285/334.4; 285/354; 285/917; 277/236
[58] Field of Search .................. 285/93, 39, 332.2, 285/332.3, 334.4, 332, 332.1, 354, 917, 55; 277/236

[56]  References Cited

U.S. PATENT DOCUMENTS

| | | | |
|---|---|---|---|
| 954,549 | 4/1910 | Turner | 285/334.4 X |
| 1,426,724 | 8/1922 | Fyffe | 285/332.3 X |
| 3,139,294 | 6/1964 | Richards | 285/917 X |
| 3,275,348 | 9/1966 | Scott | 285/332.3 X |
| 4,113,284 | 9/1978 | Blocker | 285/334.4 X |
| 4,555,129 | 11/1985 | Daulin | 285/93 X |
| 4,648,632 | 3/1987 | Hagner | 285/93 X |
| 5,280,967 | 1/1994 | Varrin | 285/93 |
| 5,393,108 | 2/1995 | Kerr | 285/917 X |

*Primary Examiner*—Dave W. Arola
*Attorney, Agent, or Firm*—Anthony J. Casella; Gerald E. Hespos

[57]  ABSTRACT

A cylinder valve outlet includes a bore with a large cylindrical entry leading to a tapered seat. A nipple with a cylindrical neck is fit into the large diameter entry of the bore of the valve outlet. The nipple further includes an arcuately convex mating end for seating in the conically tapered seat of the valve outlet. A seal enhancer is between the valve outlet and the nipple. The seal enhancer is generally tubular with opposed leading and trailing ends and a cylindrical section therebetween. The leading end is tapered for engagement between the tapered seat of the valve outlet and the mating end of the nipple. The trailing end of the seal enhancer is flared outwardly. The seal enhancer is shorter than the mating portions of the nipple so that the outwardly flared trailing end is visually readily apparent. The outwardly flared trailing end also facilitates separation of the seal enhancer from either the nipple or the valve outlet when the gas cylinder is being replaced.

18 Claims, 2 Drawing Sheets

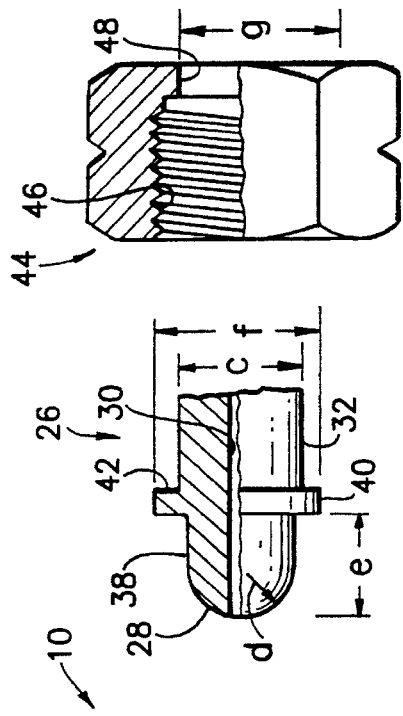
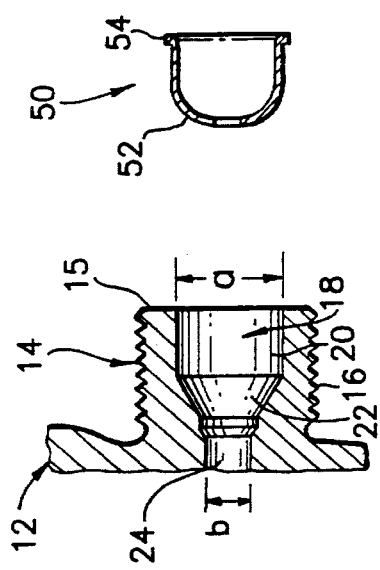
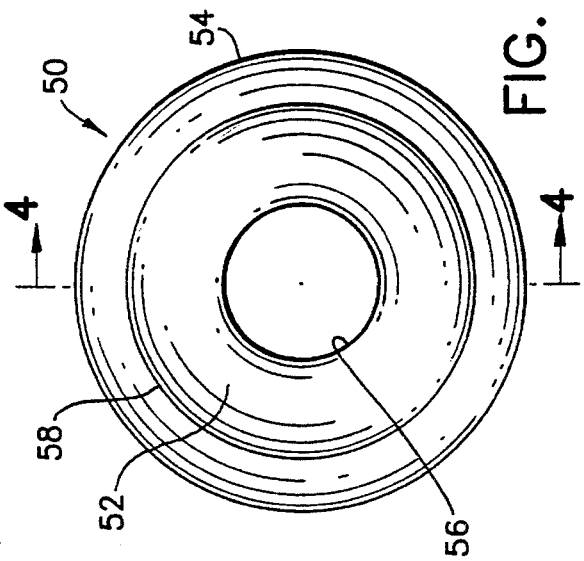
FIG. 1
FIG. 2
FIG. 3

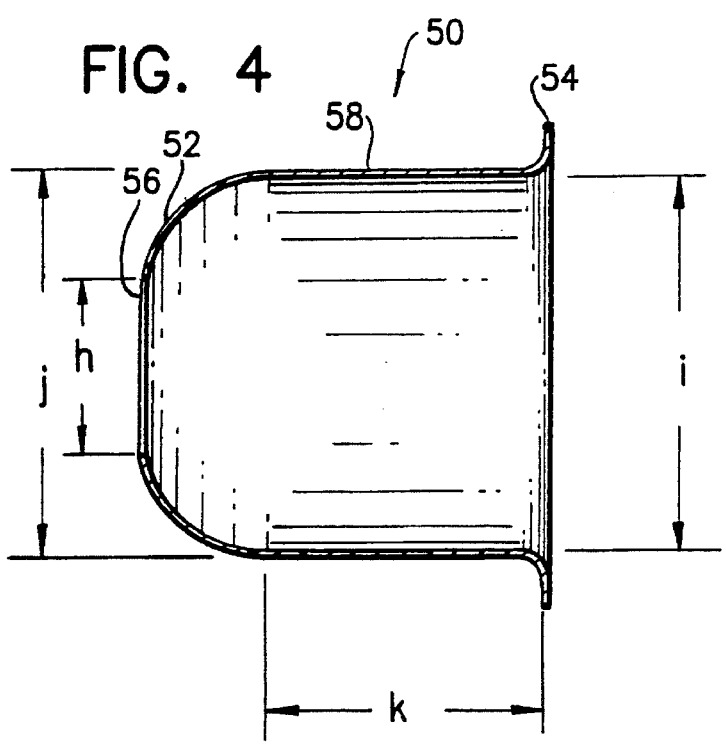
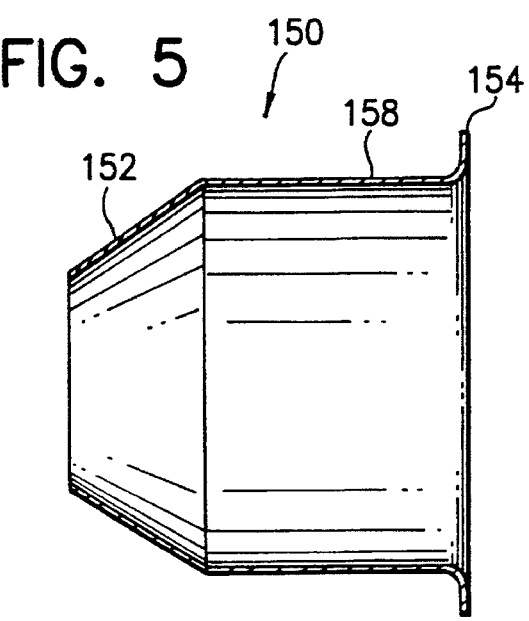
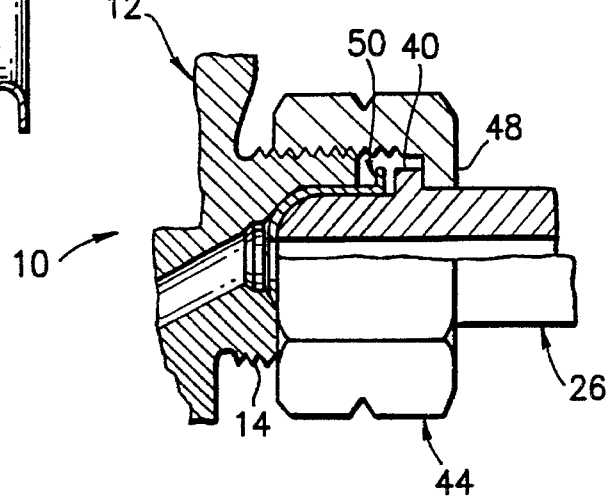

SEAL ENHANCER FOR CYLINDER VALVE CONNECTION

BACKGROUND OF THE INVENTION

1. Field of the Invention.

The subject invention relates to an improved seal between an elongate convex metallic nipple and a concave recessed metallic seal surface, such as in a cylinder valve connection.

2. Description of the Prior Art.

Many chemical processes require the presence of a specified gas. Examples of gases required in various chemical processes are: arsine, carbon monoxide, deuterium, deuterium selenide, diborane, 1,1-difluoroethylene, ethane, ethylene, germane, hydrogen, hydrogen selenide, methane, methyl fluoride, natural gas, pentaborane, phosphine, silane, stibine, tetrafluoroethylene, vinyl fluoride. The selection of a particular gas and the assurance of purity of the gas are very important. Gases typically are stored under high pressure in metallic containers. The most common such containers are referred to as gas cylinders, which typically are considered to include metallic containers that are dimensioned to hold up to 1,000 pounds of water. Larger containers typically are referred to in the industry as ton containers. Still larger containers used for transporting gas are referred to in the industry as tube trailers.

Gases can be produced with a very high degree of purity. However, impurities can become a significant factor during the initial filling of the metallic container and subsequently as the gas flows from the metallic container and toward its intended point of use. Impurities also can be a factor when the container is prepared under heat and vacuum prior to filling.

The prior art gas container typically has a valve which can be selectively opened or closed to permit the filling of the cylinder and to subsequently permit the use of the gas. The typical prior art valve for a gas container includes a generally tubular metallic outlet with an array of threads and an internal bore which communicates with the valving element and with the interior of the gas container. The bore of the prior art valve outlet typically includes a large diameter cylindrical entry, a recessed conically tapered metallic seal surface and a smaller diameter cylindrical channel leading from the tapered outlet seat toward the valving element and the interior of the gas container.

The prior art valve outlet of a gas container is used with a prior art nipple. The nipple is an elongate generally tubular metallic member having opposed ends and a gas passage extending axially therethrough. One end of the prior art nipple includes a cylindrical neck having a diameter less than the diameter of the enlarged cylindrical entry to the bore of the valve outlet. The cylindrical neck terminates at a convexly arcuate mating end which is dimensioned to engage the conically tapered seat of the valve outlet to define an annular region of metal-to-metal mating contact.

The prior art nipple further includes a shoulder adjacent the cylindrical neck of the nipple and a shank which extends from the shoulder toward the opposed end of the nipple. The shank defines a diameter less than the diameter of the shoulder. Thus, a radially aligned step is defined between the shoulder and the shank.

The prior art valve outlet connection further includes a nut having an array of threads that can be mated with the threads on the valve outlet. The prior art nut further includes an inwardly extending flange defining an opening that is greater than the diameter of the shank on the nipple but smaller than the diameter of the shoulder on the nipple. Thus, the inwardly extending flange on the nut will engage against the step on the shoulder of the prior art nipple. The flange of the nut will exert axial forces on the shoulder of the nipple as the nut is threadedly engaged with the valve outlet. These axially forces are intended to urge the arcuately convex mating end of the nipple into sealing engagement with the conically tapered seat in the bore of the valve outlet.

The above described prior art connection generally works well. However, the nose of the prior art nipple and/or the tapered seat of the prior art bore can become galled after several mating and unmating operations. Discontinuities in either of the two mating surfaces can affect the quality of the seal. An imperfect seal may permit gas that had been stored in the container to escape and/or can permit ambient air to contaminate the gas being filled into the container delivered from the container to a specified chemical process. Impurities in the gas used in many industries, such as the semiconductor industry, can significantly affect the quality of the product being produced. Additionally, galling, scratches or other surface discontinuities become worse over time and can spread from one component to another. Thus, for example, a surface discontinuity on one nipple can cause a similar surface discontinuity on a valve outlet mated therewith. After the gas in the cylinder has been depleted, the cylinder with the damaged valve outlet will be refilled and may be used with another nipple. The surface discontinuity that had been imposed upon the tapered seat of the valve outlet will then create a new surface discontinuity in the next nipple mated therewith.

Fittings employed in other environments frequently use gaskets, washers or seals to prevent damage or to minimize the effects of damage. Many such prior art fittings employ gaskets, washers or seals formed from an elastomeric material. The elastomer will deform during mating and will fill any surface discontinuities that may exist. Elastomers, however, generally are unacceptable for most high purity gas delivery systems. In particular, particles of the elastomeric material can contaminate the otherwise highly pure gas. Furthermore, some gases can leak through a thin polymer gasket. As a result, elastomeric gaskets typically are not used in systems for delivering high purity gases.

Annular metallic gaskets with opposed parallel planar faces often are used in high purity gas delivery systems. The planar faces of these prior art gaskets generally are placed between opposed planar mating faces of a fitting. Prior art gaskets of this general type are not suitable for the above described gas containers in view of the recessed portion of the outlet and the elongate nose of the nipple which results in an inaccessible seal region.

The prior art also includes shallow dished washers to fit between mating convex and concave surfaces of a fitting. Shallow dished washers are shown, for example, in U.S. Pat. No. 1,649,673 to Dyck, U.S. Pat. No. 3,797,835 to Wehner, U.S. Pat. No. 4,540,205 to Watanabe et al. and U.S. Pat. No. 4,570,981 to Fournier et al. Shallow dished washers have been used in the prior art primarily to seal joints where the convex member is axially very short. Even in these situations, mounting of the dished washer has been difficult. For example, U.S. Pat. No. 3,797,835 to Wehner shows a complexly formed washer with clearly distinct angularly aligned surfaces for closely engaging comparable surfaces to be sealed. U.S. Pat. No. 4,540,205 to Watanabe et al. shows a tapered surface with an axially aligned annular groove and a dished washer with an axially aligned cylindrical projection that can be engaged in the groove of the tapered surface for holding the washer during assembly. Both the tapered surface and the cylindrical portion of the dished washer must be precisely manufactured relative to one another, thereby preventing the use of conventional valve outlets and nipples and adding significantly to costs. U.S. Pat. No. 4,570,981 to Fournier et al. includes an elastomeric sealing ring at the inner circumferential portion of the gasket. The elastomeric member will assist in holding the prior art dished washer in position prior to and during assembly. As noted above, the use of elastomeric materials in proximity to highly pure flowing gases is unacceptable.

Axially short dished washers would be undesirable for use with the above described cylinder valves and nipples in that precise positioning of the axially short dished washer at the mating end of the nipple could not be assured. A significantly off-center seating of a dished washer could readily occur and could either impede the gas flow or contribute to leaks across the seal. A soft metallic coating over the nose of the nipple could provide a high quality seal during the first mating of the nipple and the valve outlet. However, the soft coating material on the nipple could be damaged by surface irregularities on the valve outlet, and such damage to a coating would contribute to leaks during subsequent connections of the nipple to the valve outlet.

Accordingly, it is an object of the subject invention to provide an enhanced seal between a cylinder valve outlet and a nipple.

It is a further object of the subject invention to provide a seal enhancer that can ensure a high quality seal between a valve outlet and a nipple, one or both of which may have surface damage.

Another object of the subject invention is to provide a seal enhancer that will prevent or minimize damage to both a valve outlet and a nipple.

Still a further object of the subject invention is to provide a seal enhancer than can be manufactured inexpensively and reliably.

Yet an additional object of the subject invention is to provide a seal enhancer that can be easily positioned and removed and that has a readily apparent visible presence.

SUMMARY OF THE INVENTION

The subject invention relates to a connection comprising a convex metallic outlet surface and an elongate metallic nipple. The outlet surface may be part of a gas cylinder valve and may include an outer end and an array of external threads. A bore extends into the outer end of the outlet and includes a large diameter cylindrical entry, a conically tapered seat and a small diameter portion extending inwardly from the small diameter end of the conically tapered seat. Thus, the conically tapered seat is substantially recessed within the outlet.

The nipple of the connection includes opposed ends and a gas passage extending axially therethrough. The nipple defines a convexly arcuate mating end and a cylindrical neck adjacent thereto. The cylindrical neck is dimensioned diametrically to fit in the large diameter entry to the bore of the outlet. The convexly arcuate end of the nipple is dimensioned to be in juxtaposed relationship to the conically tapered seat of the outlet. The nipple of the subject connection further includes a shoulder projecting radially outwardly adjacent the neck. A shank projects from the shoulder toward the opposed end of the nipple and defines a diameter less than the outer diameter of the shoulder. Thus, a radially aligned step exists between the shoulder and the shank of the nipple.

The connection of the subject invention may further include a nut that is threadedly engageable with the threads on the valve outlet. The nut includes an inwardly extending flange for engaging the step defined by the shoulder of the nipple. Thus, the flange exerts axial forces on the shoulder as the nut is tightened onto the array of threads on the outlet. Sufficient threaded tightening will urge the convexly arcuate mating end of the nipple toward the conically tapered seat of the outlet.

The connection of the subject invention further includes a seal enhancer disposed between the conically tapered seat of the outlet and the nipple. The seal enhancer is a generally tubular structure having a tapered leading end and an outwardly flared trailing end. Portions of the seal enhancer between the tapered leading end and the outwardly flared trailing end may be generally cylindrical and may be dimensioned to be slidably mounted over the cylindrical neck of the nipple. The tapered leading end of the seal enhancer is configured and dimensioned to seat over the arcuately convex mating end of the nipple. In particular, the tapered end of the seal enhancer may have a tapered arcuate configuration generally conforming to the arcuately convex mating end of the nipple. Alternatively, the tapered end of the seal enhancer may have a conically generated shape generally conforming to the conically tapered seat of the valve outlet. In still other alternate embodiments, the tapered leading end of the seal enhancer may have a shape slightly different from both the nipple and the valve outlet, such as an arcuately convex shape defining a radius larger than the radius defined by the arcuately convex nose of the nipple.

The overall axially length of the seal enhancer is less than the overall axial length of the neck and the arcuately convex mating end of the nipple, but greater than the length of the cylindrical entry of the outlet. As a result, the outwardly flared trailing end of the seal enhancer will be spaced from the shoulder of the nipple and from the outer end of the outlet. This outwardly flared configuration of the trailing end of the seal enhancer and the relative position of the outward flare on the neck of the nipple makes the seal enhancer visually apparent to a person separating the nipple from the outlet. Visual distinction can be made greater by color dying the outward flare on the seal enhancer. The person removing the nipple from the outlet will then know that the visually apparent seal enhancer can be replaced prior to reconnecting the nipple to the outlet. The outward flare at the trailing end of the seal enhancer also is useful for placing the seal enhancer on the nipple or removing the seal enhancer from the nipple or from the outlet. In this regard, the outward flare provides a convenient accessible structure that can be manually gripped to place the seal enhancer on the nipple without manually touching regions of the seal enhancer on or close to the sealing surfaces. Thus, contaminants are less likely to affect the flow of high purity gas from a gas container. Similarly, the outward flare provides convenient structure for gripping the seal enhancer to effect removal from the nipple. However the outward flare can be conveniently dimensioned to lie within the confines of the nut and between the outer end of the outlet and the shoulder of the nipple so as not to require a large connection.

The seal enhancer preferably is formed from a material slightly softer than the metallic material of the outlet and of the nipple. For example, the seal enhancer may be formed from nickel. The softer metal material disposed between the outlet and the nipple will substantially prevent damage to the mating surfaces. Additionally the seal enhancer will enable a high quality and effective seal between the outlet and the nipple even if one or both surfaces have defects. In some embodiments a thin coat of a low friction material, such as PTFE, may be applied to all surfaces of the seal enhancer.

BRIEF DESCRIPTION OF THE DRAWINGS

FIG. 1 is an exploded side elevational view, partly in section showing a cylinder valve outlet connection in accordance with the subject invention.

FIG. 2 is a side elevational view showing the seal enhancer of the subject invention mounted to a nipple.

FIG. 3 is an end elevational view of the seal enhancer shown in FIG. 1.

FIG. 4 is a cross-sectional view taken along line 4—4 in FIG. 3.

FIG. 5 is a cross-sectional view similar to FIG. 4 but showing an alternate seal enhancer.

FIG. 6 is a cross-sectional view of the fully assembled cylinder valve outlet connection and seal enhancer in accordance with the subject invention.

DETAILED DESCRIPTION OF THE PREFERRED EMBODIMENT

A cylinder valve outlet connection in accordance with the subject invention is identified generally the numeral 10 in FIGS. 1 and 6. The outlet connection 10 is part of a cylinder valve 12 which is mounted to a gas cylinder (not shown). The cylinder valve 12 is formed from steel and has an outlet 14 projecting transversely therefrom. The outlet 14 includes an outer end 15, an array of external threads 16 and a bore identified generally by the numeral 18 extending into the outer end 15. The bore 18 includes a large cylindrical entry 20 with a diameter "a". An outlet seat 22 is adjacent the large entry 20 and conically tapers at an angle of about 70°. The conically tapered outlet seat 22 leads to a small diameter passage 24 of diameter "b". The passage 24 extends to the valving element of the cylinder valve 12 and further communicates with gas stored in the cylinder. The relative dimensions of the valve outlet are built with precision to standards established by the Compressed Gas Association, Inc. (CGA). For example, one standard prior art gas cylinder valve outlet has a large cylindrical entry 20 where the diameter "a" equals 0.505 inch and wherein the small diameter passage 24 has a diameter "b" equal to 0.107 inch. The prior art CGA approved valve outlet can be part of the connection 10 of the subject invention.

The prior art valve outlet 10 further includes a steel nipple 26. The nipple 26 is an elongate thick-walled tubular member having a convexly arcuate mating end 28, an opposed end (not shown) and a gas passage 30 extending axially therebetween. The gas passage 30 has a diameter approximately equal to the diameter "b" of the passage 24 in the valve 12. Major portions of the nipple 26 between the opposed ends define a shank 32 having a nominal outside diameter "c" of approximately 0.562–0.557 inch for use with the standard valve 12 described above. The convexly arcuate mating end 28 portion defines a radius "d" of approximately 0.240–0.235 generated about the longitudinal axis of the nipple 26. Portions of the nipple 26 adjacent the arcuately convex mating end 28 define a cylindrical neck 38. The cylindrical neck 38 defines a diameter substantially equal to twice the radius "d" such that outer surface regions of the convexly arcuate mating end 28 merge smoothly into the cylindrical outer surface regions of the neck 38.

The nipple 26 further includes an outwardly projecting shoulder 40 between the neck 38 and the shank 32. The shoulder 40 is spaced from the end 28 of the nipple 26 by a distance "e" of approximately 0.552–0.572 inch and defines an outside diameter "f" of approximately 0.735 which is greater than the above referenced outside diameter "c" of the shank 32. As a result, a generally radially aligned step 42 is defined on portions of the shoulder 40 facing the shank 32.

The valve outlet connection 10 further includes a nut 44 having an array of internal threads 46 which are dimensioned to threadedly engage the external threads 16 on the valve outlet 14. The nut 44 further includes an inwardly projecting annular flange 48 at one longitudinal end thereof. The flange 48 defines an opening of inside diameter "g" which is greater than the outside diameter "c" of the shank 32 on the nipple 26, but less than the outside diameter "f" of the shoulder 40. Thus, the flange 48 can engage the radially aligned step 42 of the shoulder 40 to exert axial forces on the shoulder 40 as the nut 44 is threadedly engaged with the valve outlet 14.

The valve outlet connection 10 further includes a seal enhancer 50 which is shown more clearly in FIGS. 3 and 4. The seal enhancer 50 is an elongate generally tubular member having a leading end 52 and a trailing end 54. The leading end 52 is formed to define a generally arcuate taper substantially conforming to the convexly arcuate mating end 28 of the nipple 26. The leading end 52 of the seal enhancer 50 is further characterized by an opening 56 of diameter "h" equal to approximately 0.25 inch. Thus, the opening 56 in the leading end 52 of the seal enhancer 50 is larger than the diameter "b" of the passage 24 in the valve outlet 14 and larger than the passage 30 through the nipple 26.

Portions of the seal enhancer 50 between the leading and trailing ends 52 and 54 define a cylinder 58, which on the embodiment depicted herein has an inside diameter "i" equal to at least 0.481 inch, an outside diameter "j" equal to no more than 0.497 inch and a length "k" of approximately 0.360 inch. The inside diameter "i" and the length "k" of cylindrical portions 58 of the seal enhancer 50 are selected relative to the diameter "2d" and length "e" of the nipple 34 to ensure axially alignment of the seal enchancer 50 and to facilitate sliding retention of the seal enhancer 50 on the nipple 26. The length "k" of the cylindrical portions 58 of the seal enhancer 50 are significant in other respects as explained further below.

The trailing end 54 of the seal enhancer 50 is outwardly flared to define a diameter "1" which in the embodiment depicted herein is approximately 0.62 inch. Thus, the flared trailing end 54 defines a diameter at least approximately 0.20 times greater than the outside diameter "j" of the cylindrical portions of the seal enhancer 50. The trailing end 54 may be dyed or coated with a color to be visually very apparent.

The seal enhancer 50 preferably may be is formed from nickel 200 having a thickness of 0.006±0.002. The entire seal enhancer 50 may be coated with a low friction polymeric material, such as PTFE, which is commercially available as Teflon to a thickness of between 0.0003–0.0007.

The cylinder valve outlet connection 10 is assembled with the nut 44 mounted over the shank 32 of the nipple 26 such that the flange 48 of the nut 44 is engageable against the radially aligned step 42 on the shoulder 40 of the nipple 26. The seal enhancer 50 is then slidably mounted over the mating end 28 and neck 38 of the nipple 26. In this position, the opening 56 in the tapered leading end 52 of the seal enhancer 50 is concentrically disposed about the passage 30 through the nipple 26. Additionally, the overall length "k" of the seal enhancer 50 is less than the axial length "e" to the shoulder 40 of the nipple 26. Hence, the outwardly flared trailing end 54 of the seal enhancer 50 will be spaced axially from the shoulder 40 on the nipple 26.

Assembly of the connection 10 proceeds by inserting the mating end 28 and the cylindrical neck 38 of the nipple 26, with the seal enhancer 50 mounted thereon, into the bore 18 of the valve outlet 14. In this regard, the outside diameter "j" of the cylindrical portion 58 of the seal enhancer 50 is less than the inside diameter "a" of the entry 20 to the bore 18 of the valve outlet 14. Assembly continues by threadedly tightening the nut 44 onto the external thread 16 of the outlet 14. Sufficient threaded tightening of the nut 44 will cause the flange 48 thereof to engage against the radially aligned step 42 of the shoulder 40 on the nipple 26 and will urge the nipple 26 and the seal enhancer 50 tightly into the conically tapered seat 22 of the valve outlet 14. The nickel from which the seal enhancer 50 is formed is softer than the steel of the valve outlet 14 and the nipple 26. Hence, the seal enhancer 50 will deform slightly and fill any surface discontinuities, scratches or galling damage that may have pre-existed on either the valve outlet 14 or the nipple 26. The optional Teflon coating on the seal enhancer 50 further prevents any abrasion related damage to either the valve outlet 14 or the nipple 26 during assembly. These surface discontinuities otherwise could have permitted a flow of gas across the connection 10. Thus a potentially contaminating effect on the gas flowing from the cylinder into the nipple 26 is prevented. Furthermore, the seal enhancer 50 can be used with a new valve 12 and nipple 26 to prevent galling, scratches and other such damage from occurring, thereby extending the life of the valve outlet.

After the gas in the cylinder is exhausted, the nut 44 is unthreaded to permit the empty cylinder to be replaced with a full cylinder. The presence of the seal enhancer 50 on the nipple 26 or in the bore 18 of the outlet 14 is made readily apparent due to the overall axial length "k" of the seal enhancer, due to the outwardly flared configuration of the trailing end 54 and due to any distinct color that may be provided. The person changing the cylinder can readily access the seal enhancer 50 at the outwardly flared trailing end 54 to facilitate its removal. Preferably the used seal enhancer 50 will be discarded and a new seal enhancer will be installed in its place. If the seal enhancer 50 remains in the valve outlet 14, it also will be visually readily apparent due to the flared trailing end 54 projecting beyond the valve outlet. The person making the cylinder change can readily grip the outwardly flared trailing portion 54 to remove the seal enhancer 50.

The embodiment described above depicts the seal enhancer 50 as having an arcuately convex leading end 52 that substantially conforms to the size and shape of the convexly arcuate mating end of the nipple 26. However, other configurations for the seal enhancer 50 can be provided. In particular, FIG. 5 shows a seal enhancer 150 having opposed leading and trailing ends 152 and 154 and a cylindrical intermediate section 158. The cylindrical intermediate section 158 and the outwardly flared trailing end 154 are substantially identical to the corresponding portions of the seal enhancer 50 described and illustrated above. The leading end 152, however, is conically tapered to substantially conform to the conical shape of the seat 22 in the valve outlet 14. The seal enhancer 150 can be used by either placing the seal enhancer 150 in the bore 18 of the valve outlet 14 or slidably mounting the seal enhancer 150 onto the nipple 26, as described and illustrated above. In this alternate embodiment, the arcuate mating end 28 of the nipple 26 will engage against the tapered leading end of the seal enhancer 150. As in the previous embodiment, the seal enhancer 150 will be disposed between the conically tapered seat 22 of the valve outlet 14 and the convexly arcuate mating end 28 of the nipple 26. The relatively soft nickel of the seal enhancer 50 will deform into surface irregularities on either of the two steel surfaces to provide a high quality seal. Additionally, the seal enhancer will function to substantially prevent damage to either of the mating surfaces of the outlet 14 and nipple 26.

While the invention has been described with respect to a preferred embodiment, it is apparent that various changes can be made without departing from the scope of the invention. In this regard, other relative dimensions can be provided and it is not essential that the leading end of the seal enhancer conformed precisely to either the shape of the nipple or the shape of the valve seat. A shape between these two configurations could be employed. These and other variations will be apparent to a person skilled in the art after having read the subject disclosure.

What is claimed:

1. A connection comprising:

an outlet formed from a metallic material and having an outer end, an array of threads and a bore extending into the outlet from the outer end, the bore including a large diameter entry and a recessed tapered seat leading from the entry;

a metallic nipple having an arcuately convex mating end disposed in the bore in juxtaposed relationship to the tapered seat, a cylindrical neck extending from said arcuately convex mating end, a portion of the neck being disposed in the large diameter entry of the bore, and a radially aligned shoulder on a portion of the nipple spaced outwardly from the outer end of the outlet;

a nut having threads engaged with the threads of the outlet, said nut having a flange engaged with the shoulder of the nipple for urging nipple into the outlet; and a seal enhancer with a leading end, a trailing end and an intermediate cylindrical portion slidably mounted on the cylindrical neck of the nipple, the leading end of the seal enhancer being tapered inwardly and being sealingly engaged between the tapered seat of the outlet and the arcuately convex mating end of the nipple, the trailing end of the seal enhancer being flared outwardly and being spaced from the shoulder of the nipple for providing visual indication of the presence of the seal enhancer and for facilitating disassembly.

2. The connection of claim 1, wherein the tapered seat of the valve outlet is conically tapered.

3. The connection of claim 2, wherein the tapered leading end of the seal enhancer is arcuate with a shape conforming to the arcuately convex mating end of the nipple.

4. The connection of claim 2, wherein the tapered leading end of the seal enhancer is conically tapered.

5. The connection of claim 1, wherein the seal enhancer is formed from nickel.

6. The connection of claim 5, wherein the seal enhancer is coated with a low friction material.

7. The connection of claim 6, wherein the low friction material is PTFE.

8. The connection of claim 1, wherein the outwardly flared trailing end of the seal enchancer is spaced from the outer end of the valve outlet.

9. The connection of claim 8, wherein the outwardly flared trailing end of the seal enhancer is formed with a material of a different color than the nipple and the outlet.

10. A seal enhancer for a gas connection, said connection comprising an outlet formed from a metallic material and having an outer end and a bore extending into the outer end, the bore including a cylindrical entry having a selected inside diameter and a selected length, a tapered seat adjacent the cylindrical entry to said bore, said connection further comprising a metallic nipple having an arcuately convex mating end, a cylindrical neck adjacent said mating end and having an outside diameter less than the inside diameter of said cylindrical entry to said valve outlet and having a length greater than the length of the cylindrical entry to said valve outlet, a shoulder on said nipple substantially adjacent said neck, wherein:

said seal enhancer being of generally tubular shape and having a tapered leading end, an outwardly flared trailing end and a cylindrical portion therebetween, said cylindrical portion defining an inside diameter greater than the outside diameter of the neck of the nipple and defining an outside diameter less than the inside diameter of said cylindrical entry to said bore, said cylindrical portion of said seal enhancer defining a length greater than the length of the cylindrical entry to said bore and less than the length of the cylindrical neck of the nipple.

11. The seal enchancer of claim 10, wherein the tapered leading end defines an arcuate shape substantially conforming to the mating end of the nipple.

12. The seal enhancer of claim 10, wherein the tapered leading end defines a conically tapered shape substantially conforming to the tapered seat of the bore in the outlet.

13. The seal enchancer of claim 10, wherein the shoulder of the nipple defines a selected outside diameter, and wherein the outwardly flared trailing end of the seal enhancer defines an outside diameter no greater than the outside diameter of the shoulder.

14. The seal enhancer of claim 10, wherein the tapered seat of the valve outlet defines a minor diameter end spaced from the entry to the bore of the valve outlet, the seal enhancer including an opening at the tapered leading end defining a diameter no less than the diameter of the small diameter end of the tapered seat in the outlet.

15. The seal enhancer of claim 10 being formed substantially of nickel.

16. The seal enhancer of claim 10 being formed of nickel having a coating of a PTFE material thereon.

17. The seal enhancer of claim 10, wherein the outwardly flared trailing end is coated with a material of a color different from the outlet and the nipple.

18. A gas cylinder valve outlet connection comprising:

a metallic gas cylinder valve having an outlet with an outer end, an array of external threads extending from the outer end and a bore extending into the outlet from the outer end, the bore including a cylindrical entry with a selected diameter and an inwardly tapered seat extending from the cylindrical entry;

a metallic nipple having an arcuately convex mating end disposed in the bore of the outlet in juxtaposed relationship to the tapered seat thereof, a cylindrical neck having a diameter less than the diameter of the entry to the bore extending from said arcuately convex mating end, a portion of the cylindrical neck being disposed in the entry to the bore, and a shoulder projecting radially outwardly from the neck and defining a selected outside diameter, the shoulder being disposed on a portion of the nipple spaced outwardly from the outer end of the outlet, and a shank adjacent the shoulder and projecting away from the mating end, said shank defining a diameter less than the shoulder;

a nut having internal threads engaged with the external threads of the valve outlet, said nut having an inwardly projecting flange engaged with portions of the shoulder of the nipple adjacent the shank thereof for urging the mating end of the nipple into the bore of the valve outlet; and a seal enhancer with an inwardly tapered leading end sealingly engaged between the tapered seat of the valve outlet and the arcuately convex mating end of the nipple, said seal enhancer further including a cylindrical portion projecting from the leading end and disposed intermediate the cylindrical neck of the nipple and the cylindrical entry to the bore of the cylinder valve outlet, and an outwardly flared trailing end spaced from the outer end of the cylinder valve outlet and from the shoulder of the nipple, whereby the outwardly flared shoulder provides visual indication of the seal enhancer and facilitates gripping and removal thereof.

\* \* \* \* \*